3,068,270
PROCESS INVOLVING THE BROMINATION OF VINYL PHOSPHATE TRIESTER COMPOUNDS
Thomas G. McKenna, Denver, Colo., assignor to Shell Oil Company, New York, N.Y., a corporation of Delaware
No Drawing. Filed Apr. 24, 1961, Ser. No. 104,794
5 Claims. (Cl. 260—461)

This invention pertains to an improved method for the preparation of the insecticide, dimethyl 1,2-dibromo-2,2-dichloroethyl phosphate.

Dimethyl 1,2-dibromo-2,2-dichloroethyl phosphate has been found to possess the combination of a high level of insecticidal activity with respect to a variety of insect species, and relatively low mammalian toxicity. Consequently, it is now undergoing development as a commercial insecticide, under the trademark, Dibrom.

This compound may be prepared by bromination of dimethyl 2,2-dichlorovinyl phosphate (commonly designated DDVP). However, as is pointed out by Allen et al., 78 Journal of the American Chemical Society 3715–3718 (1956), the bromination is effected, even with the aid of actinic light, only with difficulty, for a side reaction, which does not lead to the desired product, can occur to a very substantial degree.

It now has been found that dimethyl 2,2-dichlorovinyl phosphate can be reacted with bromine to form the addition product, dimethyl 1,2-dibromo-2,2-dichloroethyl phosphate, as substantially the only product by conducting the reaction in the presence of a solvent and in the presence of a catalytic amount of a compound yielding free radicals.

Preferably, the bromination is conducted by bringing together appropriate amounts of dimethyl 2,2-dichlorovinyl phosphate, bromine and an inert aliphatic solvent, in the presence of a catalytic amount of a peroxidic compound and at a temperature of from about 25° C. to about 150° C.

The catalysts which are employed are compounds which will decompose to give free radicals, yet which will not react with any of the components of the reaction mixture. Suitable compounds of this kind include peroxygen-type compounds—i.e., peroxidic compounds—including for example, acyl peroxides such as acetyl peroxide, benzoyl peroxide, lauroyl peroxide, and stearoyl peroxide; hydrocarbon peroxides and hydroperoxides such as di-tert-butyl peroxide, di-tert-amyl peroxide, tert-butyl hydroperoxide, tetralin peroxide, urea peroxide, diethyl peroxide, dicyclohexyl peroxide, diamyl peroxide, p-cymene hydroperoxide, and non-hydrocarbon peroxides such as ascaridole, cyclohexanone peroxide and the like. Also suitable are inorganic per-compounds such as hydrogen peroxide, sodium perborate; potassium persulfate; alkali metal percarbonates; hydrazine derivatives such as hydrazine hydrohalides and dibenzoyl hydrazine; organometallic compounds such as tetraethyl lead, and the like. Preferred are hydrocarbon peroxides and hydroperoxides forming among their initial decomposition products, hydrocarbyloxy free radicals. Such peroxides are described in detail in U.S. Patents Nos. 2,537,857 and 2,379,218.

Only catalytic quantities of the free radical-yielding compound are required. Quantities of as little as 0.001 percent to 1.0 percent, based on the weight of the vinyl phosphate, ordinarily are sufficient to give excellent yields of the 1,2-dibromo-2,2-dichloroethyl phosphate product. To avoid the possibility of undesirable side reactions, quantities of more than about 5 percent of the catalyst, based on the weight of the vinyl phosphate, should not be employed. In most cases, optimum yields of the dibromoethyl phosphate product are obtained from the use of from about 0.01 percent to about 1.0 percent of the catalyst, based upon the weight of the vinyl phosphate.

The reaction of the vinyl phosphate and the bromine can be conducted at any convenient temperature within the range of from about 20° C. to about 150° C. However, in most cases, it will be found most desirable to employ reaction temperatures of from about 50° C. to about 120° C.

At least the stoichiometric amount of bromine, relative to the amount of vinyl phosphate employed, is used, and it will ordinarily be found desirable to use a small excess—say, up to 10% molar excess—of the bromine. To avoid side reactions, it is desirable to avoid more than about a 10% molar excess of bromine. In most cases, it will be found best to use from about 1% to about 5% molar excess of bromine.

The reaction between the bromine and the vinyl phosphate is normally best conducted by adding the bromine to the vinyl phosphate and the catalyst mixed in the solvent, although the solvent can be distributed between the vinyl phosphate and bromine. Preferably, the bromine, if desired dissolved in solvent, is added slowly to the well-mixed phosphate-catalyst-solvent mixture.

Any organic liquid which is a solvent for the vinyl phosphate and which is inert with respect to the components of the reaction mixture can be used. Suitable are the aromatic hydrocarbons, the halogen-substituted aromatic hydrocarbons, and halogen-containing aliphatic organic liquids. Of the aromatic hydrocarbons, which term includes hydrocarbon-substituted aromatic hydrocarbons such as toluene, xylene, diphenyl and the like, benzene is to be preferred, and likewise, halogen-substituted benzenes are preferred. In these halogen-substituted aromatic compounds, as in the halogen-containing aliphatic organic liquids, the middle halogens—that is bromine and chlorine—are desirable. The preferred halogen-containing aliphatic compounds are the lower molecular weight halogenated alkanes—for example, the haloalkanes of up to six carbon atoms—including chloroform, carbon tetrachloride, methylene dichloride, tetrachloroethane, ethylene dibromide, and the like.

It has been found that a solvent/vinyl phosphate weight ratio of at least 0.25 is required to obtain a high yield of high-purity product. Preferably at least 0.5 part by weight of solvent is used per part by weight of vinyl phosphate. While greater amounts of solvent, relative to the amount of vinyl phosphate, can be used, in general it is preferred not to exceed about 5 parts of solvent per part by weight of vinyl phosphate. In many cases, it will be found best to employ about one part by weight of solvent per part by weight of vinyl phosphate.

The dibromoethyl phosphate product can be recovered from the reaction mixture by the usual methods. For example, the product can be recovered by distilling off the solvent, using reduced pressure to avoid the possibility of product decomposition, then distilling, under vacuum, the product from any small amounts of higher boiling materials that may be present, and from any remaining catalyst. In cases where the solvent used is one which also is suitable for use in an insecticidal formulation, but part, or none, of the solvent need be removed.

As illustrations of the preferred aspect of the method of this invention, the following examples are submitted.

EXAMPLE I

In a glass reaction flask, coated to prevent admission of light, equipped with agitator, dropping funnel and reflux condenser, a solution was prepared containing 110 grams (0.5 mole) of dimethyl 2,2-dichlorovinyl phosphate in 115 grams of carbon tetrachloride and containing 0.1159 gram of benzoyl peroxide. The solution was heated to 80° C. and while stirring 83 grams (0.52 mole)

of bromine was added from the dropping funnel over a period of about 30–90 minutes while maintaining the temperature at 79–81° C. After all the bromine was added, the mixture was stirred for an additional 15 minutes and the solvent was then removed by reducing the pressure to about 25–30 millimeters mercury absolute. 190 grams of a light yellow product was obtained containing 95% w. dimethyl 1,2-dibromo-2,2-dichloroethyl phosphate with a melting point of 26.6° C.

EXAMPLE II

To investigate the effect of catalyst concentration on the purity and yield of product, the experiment set forth in Example I was repeated, all conditions being the same, except that the catalyst concentration was varied. The following results were obtained:

TABLE I

*Effect of Catalyst Concentration*

[Catalyst used: Benzoyl peroxide]

| Concentration of catalyst (percent by weight of dimethyl 2,2-dichlorovinyl phosphate used) | 1,2-dibromo-2,2-dichloroethyl phosphate product | |
|---|---|---|
| | Purity (percent by weight) | Yield (mole percent) |
| 1.0 | 92.1 | 92.4 |
| 0.50 | 94.6 | 92.4 |
| 0.10 | 95.5 | 95.4 |
| 0.05 | 95.6 | 94.6 |
| 0.025 | 94.9 | 93.9 |

It will be noted that highest yields of purest product were obtained at catalyst concentrations of from about 0.05% to about 0.10%, based on the weight of the vinyl phosphate used.

EXAMPLE III

The experiment set forth in Example I was again repeated, but with the exception that light was not excluded from the reaction zone. Essentially the same results were obtained whether or not light was excluded.

EXAMPLE IV

Repetition of the experiment set forth in Example I, but omitting any solvent, reduced the purity of the product to about 89% by weight, demonstrating that the presence of a solvent is essential to obtention of a highly pure product.

EXAMPLE V

To establish the effectiveness of free radical-generating compounds as catalysts for the bromination, a series of experiments were conducted, only the catalyst being different from experiment to experiment, and other process conditions being the same. The amount of catalyst used was 0.1 percent by weight, based on the vinyl phosphate. The reaction temperature was 80° C. The solvent was carbon tetrachloride, the weight ratio of solvent to the vinyl phosphate being substantially one. The reactions were carried out in the dark. In each case, the small excess (1–5 percent) of bromine was employed. Table II sets out the results of the experiments.

TABLE II

| Catalyst | Purity of Product (percent by weight) |
|---|---|
| None | 68 |
| t-butyl perbenzoate | 94.4 |
| Lauroyl peroxide | 93.8 |
| Benzoyl peroxide | 94.6 |
| Acetyl peroxide | 93.2 |
| t-butyl hydroperoxide | 93.4 |
| 2,5-dimethyl-2,5-di-(t-butylperoxy)hexyne [1] | 94.4 |
| Cyclohexanone peroxide | 92.6 |
| 2,5-dimethyl-2,5-di-(t-butylperoxy)hexane [2] | 91.9 |
| di-t-butyl peroxide | 91.3 |
| Perbenzoic acid | 87.9 |
| Ascaridole | 87.2 |
| Urea peroxide | 84.9 |
| Hydrogen peroxide (35% of 70% aqueous solution) | 93.4 |
| Potassium peroxy disulfate | 91.1 |
| Sodium perborate | 88.8 |
| Sodium percarbonate | 86.6 |
| Hydrazine dihydrochloride | 90.6 |

[1] A commercial product named Luperco 130-XL, containing the active material impregnated upon an equal weight of an inert filler.
[2] A commercial product named Luperco 101.

It is evident from these results that the bromination of dimethyl 2,2-dichlorovinyl phosphate is catalyzed by free radical-generating compounds generally, resulting in very pure product.

The results obtained by conducting the bromination in the presence of the catalyst are in marked contrast to the results obtained when no catalyst is used, for where no catalyst is present and the reaction is conducted in the dark at comparable temperatures, the yield of dimethyl 1,2-dibromo-2,2-dichloroethyl phosphate is but about 66%, the purity of the product being but about 68%.

I claim as my invention:

1. A method for preparing dimethyl 1,2-dibromo-2,2-dichloroethyl phosphate which comprises reacting dimethyl 2,2-dichlorovinyl phosphate with bromine at a temperature of from about 50° C. to about 150° C. in the presence of an inert solvent and of a catalytic amount of a compound yielding free radicals.

2. A method for preparing dimethyl 1,2-dibromo-2,2-dichloroethyl phosphate which comprises reacting dimethyl-2,2-dichlorovinyl phosphate with bromine at a temperature of from about 50° C. to about 150° C. in the presence of an inert aliphatic solvent and of a catalytic amount of a peroxidic compound.

3. A method for preparing dimethyl 1,2-dibromo-2,2-dichloroethyl phosphate which comprises reacting dimethyl 2,2-dichlorovinyl phosphate with bromine in the presence of a halogenated alkane of up to six carbon atoms as solvent and of a catalytic amount of a peroxidic compound at a temperature of from about 50° C. to about 150° C.

4. A method for preparing dimethyl 1,2-dibromo-2,2-dichloroethyl phosphate which comprises reacting dimethyl 2,2-dichlorovinyl phosphate with bromine at a temperature of from about 50° C. to about 150° C. in the presence of an inert solvent and of a catalytic amount of benzoyl peroxide.

5. A method according to claim 4 wherein the solvent is a halogenated alkane of from 1 to 6 carbon atoms.

References Cited in the file of this patent

UNITED STATES PATENTS

| 2,574,515 | Walter et al. | Nov. 13, 1951 |
| 2,971,882 | Ospenson et al. | Feb. 14, 1961 |

FOREIGN PATENTS

| 214,456 | Austria | Apr. 10, 1961 |

OTHER REFERENCES

Allen et al.: "J. Am. Chem. Soc.," vol. 78, pp. 3715–3717.